_United States Patent Office_

3,737,411
Patented June 5, 1973

3,737,411
CURED POLY(ARYLENE SULFIDE) RESINS WITH QUINONES AND THEIR PREPARATION
Lacey E. Scoggins, Bartlesville, Okla., assignor to Phillips Petroleum Company
No Drawing. Filed May 19, 1971, Ser. No. 144,987
Int. Cl. C08g *15/00*
U.S. Cl. 260—63 R    11 Claims

ABSTRACT OF THE DISCLOSURE

The processing characteristics of poly(arylene sulfide) resins are improved by incorporating therein a small amount of at least one compound possessing a quinone structure. The aromatic sulfide polymers treated in accordance with the invention retain their thermoplastic nature and can be used in a variety of industrial applications, e.g., as molding compositions.

---

This invention relates to aromatic sulfide polymers having improved processing characteristics. In accordance with another aspect, this invention relates to curable poly(arylene sulfide) resins having incorporated therein a finite but small amount of at least one compound possessing a quinone structure. In accordance with another aspect, this invention relates to a process for decreasing the melt flow of arylene sulfide polymers by incorporating a small amount of at least one compound possessing a quinone structure and heating. In accordance with another aspect, this invention relates to the production of arylene sulfide polymers characterized by a low melt flow which can be molded and which possess high temperature stability. In accordance with a further aspect, this invention relates to poly(phenylene sulfide) resins having incorporated therein a melt flow reducing amount of at least one compound possessing a quinone structure so as to effect a reduction in the melt flow of the polymer under the influence of heat and an oxygen-containing gaseous oxidizing atmosphere.

Aromatic sulfide polymers ranging in consistency from viscous liquids to crystalline solids are known. While such polymers exhibit desirable properties for many applications such as molding compositions, the unmodified polymers normally possess a relatively high melt flow, e.g., above 1000, which inhibits their use. For example, when exposed to process temperatures above their melt point, the unmodified polymers tend to substantially degrade or, at the least, require excessive processing times. Since the desirable properties make the polymers extremely useful, it would be advantageous to improve the processability of the solid polymers without materially affecting desirable properties. Additionally, while polymers of this type exhibit desirable properties for many applications such as molding compositions, the unmodified polymers, e.g., obtained directly from the reactors, normally possess a high melt flow which limits their use in certain instances. Such polymers, i.e., the unmodified materials, possess a very low melt viscosity which makes it difficult to handle them by conventional molding practices.

Unexpectedly, I have discovered that a certain class of additives can be employed for curing and decreasing the melt flow of sulfur-containing polymers without causing any appreciable loss in desirable properties. The resulting polymer thus obtained is a stable, resinous material which remains sufficiently thermoplastic to further pressure mold and shape, press into sheet or draw or extrude into fibers. The sulfur-containing polymeric materials which are modified according to the invention do not degrade materially at normal processing temperatures and can be readily formed into useful molded articles.

Accordingly, an object of this invention is to improve the processing characteristics of poly(arylene sulfide) resins.

A further object of this invention is to provide poly(arylene sulfide) resins having improved molding and extruding characteristics.

A further object of this invention is to provide a curing additive for poly(arylene sulfide) resins.

A further object of this invention is to provide a melt flow reducing additive for poly(arylene sulfide) resins.

A still further object of this invention is to improve the processing characteristics of poly(arylene sulfide) resins by reducing the melt flow without substantially altering the other physical properties of the resin.

Other objects and aspects as well as the several advantages of the invention will be apparent to those skilled in the art upon reading the specification and the appended claims.

In accordance with the invention, a curing or melt flow reducing amount of at least one compound possessing a quinone structure is incorporated into poly(arylene sulfide) resins.

In accordance with one embodiment of the invention, the melt flow of thermoplastic poly(arylene sulfide) resins is decreased by heating at a temperature below the melting point of the polymer in the presence of at least one compound possessing a quinone structure.

In accordance with another embodiment of the invention, a curable poly(arylene sulfide) resin composition capable of being cured to a free flowing particulate product is provided comprising a poly(arylene sulfide) resin having incorporated therein a curable amount of at least one compound possessing a quinone structure.

In accordance with a further embodiment of the invention, the melt flow of poly(phenylene sulfide) resins is decreased by heating the polymer in the presence of a melt flow modifier comprising a tetrahaloquinone compound at a temperature below the melting point of the polymer for a time sufficient to effect a substantial decrease in the melt flow of the polymer molecules.

It has now been found, according to the invention, that an improved class of poly(arylene sulfide) resins can be obtained by heating sulfur-containing polymers such as disclosed and claimed in Edmonds et al., U.S. Pat. 3,354,129, at a temperature below the melt point of the resin for a time sufficient to effect a reduction in the melt flow of the resin in the presence of at least one melt flow modifier possessing a quinone structure. The so-modified polymer is a stable resinous material which retains its original physical appearance, e.g., particulate shape, and remains sufficiently thermoplastic to form into shaped objects as by injection or compression molding, with substantially reduced processing times. The poly(arylene sulfide) resins which are modified according to the invention do not degrade materially at normal processing temperatures and exhibit improved processability at such temperatures.

It is to be understood that the properties of the polymeric material modified according to the invention can vary considerably depending upon the nature of the starting material, such as the molecular weight, melt viscosity, and the like. The length of time and temperature of the heat treatment can also be used to vary the properties within wide limits, it being understood that even after the mildest treatment, some improvement in heat stability and processing capability is obtained.

The present invention is useful with poly(arylene sulfide) resins generally regardless of the method of preparation. It can be used, for example, with poly(arylene sulfide) resins prepared as described in U.S. Pat. 2,513,188 wherein polyhaloaromatic compounds are reacted with sulfur and a metal sulfide at the fusion temperature. It can also be used with resins manufactured by the method described in British Pat. 962,941 wherein metal salts of halothiophenols are heated at a polymerizing temperature. The invention is particularly useful with polymers prepared by the solution reaction of polyhalo compounds with alkali metal sulfides as described in U.S. Pat. 3,354,129, Edmonds et al.

According to the said Edmonds et al. patent, poly(arylene sulfide) resins, often called poly(phenylene sulfide) resins, can be prepared in high yields by reacting (a) at least one polyhalo-substituted cyclic compound containing unsaturation between adjacent ring atoms wherein the halogen atoms are attached to ring carbon atoms with (b) an alkali metal sulfide in a polar organic diluent at an elevated temperature. Generally, the polar organic diluent will essentially dissolve both of the alkali metal sulfide and the polyhalo-substituted aromatic compound or other compound which can be present. The polymers produced by the process of said Edmonds et al. patent are ordinarily particulate materials and the properties of these materials will vary considerably depending upon the chosen reactants. Some are high-melting thermoplastic materials having extra high temperature stability while others can be much lower in molecular weight, including liquids and grease-like materials. Melting points and softening points of these materials can range all the way from liquids at 25° to polymers softening above 400° C., and the latter materials are ordinarily very difficult to process in conventional molding and extruding equipment.

The melt flow modifiers or curing agents that can be employed according to the invention can be any compound possessing a quinone structure. Representative additives that can be employed include benzoquinones, anthraquinones, and naphthoquinones including halogen and hydrocarbyl-substituted quinones.

The quinones that can be employed according to the invention can be represented by the following structural formulas:

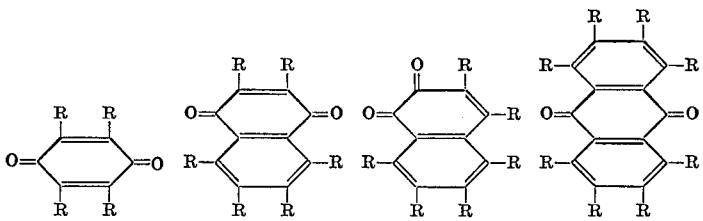

wherein R is a halogen, hydrogen or an alkyl having from 1 to 20 carbon atoms or a combination of any of the substituents.

Specific examples of useful quinones include p-benzoquinone, anthraquinone, 1,4-naphthoquinone, 1,2-naphthoquinone, tetrachloroquinone (chloranil), tetrabromoquinone, trichlorobromoquinone, 5,8-diethyl-1,4-naphthoquinone, 5,8-di-n-butyl-1,2-naphthoquinone, 2,6-dimethyl-9,10-anthraquinone, 5-tert-dodecyl-1,4-naphthoquinone, 2-tert-octyl - 9,10 - anthraquinone, 2,7-dichloro-9,10-anthraquinone, and the like.

The amount of quinone compound present in the mixture of modifier and polymer according to the invention will be sufficient to substantially reduce the melt flow and effect cure of the polymer. The amount of modifier used will depend mainly upon the chosen polymeric product and the decrease in melt flow or degree of cure desired and upon other variables selected by one skilled in the art. Generally, the amount of quinone incorporated into the polymers of arylene sulfides will range from 0.1 to about 10 weight percent of the polymer. Particularly beneficial decreases in melt flow have been obtained with about five weight percent of quinone based on total polymer.

The process of the invention can be carried out by forming a homogeneous dispersion of at least one of the above defined polymeric materials and at least one compound possessing a quinone structure. Formation of the dispersion can be carried out in any suitable manner, including dry mixing, grinding the ingredients together, or mixing in the presence of a dispersing medium. When employing a dispersing medium, the slurry of polymer and quinone additives in a dispersing medium is agitated to form a homogeneous mixture in a manner so as to minimize evaporation of the dispersing medium during mixing. Formation of the mixture and subsequent separation of the dispersing agent, if used, is normally carried out at a temperature below the melting point of the polymer. Following formation of the mixture, the dispersing medium, if used, can be separated by such methods as filtration, decantation, evaporation, and the like.

Exemplary dispersing media include methanol, ethanol, isopropanol, water, hydrocarbons such as benzene, toluene, cyclohexane, normal-heptane, and the like, acetone, diethyl ether, and others, including mixtures of two or more of such materials.

In accordance with the invention, a mixture of polymer and quinone is heated to a temperature which is below the melting point of the chosen polymeric product for a period of time sufficient to effect cure and reduce the melt flow. The melt point of arylene sulfide polymers can be readily determined by differential thermal analysis (DTA) by heating a 10 mg. sample of the polymer at a rate of 10° C. per minute. The melt point is taken from the DTA thermogram in a conventional manner. This temperature will vary from the range of about 200° F. to about 800° F. depending upon the molecular weight of the polymeric product being treated in accordance with the invention. Generally, the treatment temperature will be in the range of from about 25° F. to 100° F. preferably 40° F. to 90° F. below the melt point of the polymer being treated. The time during which the mixture is held at such a temperature will be sufficient to effect cure and reduce the melt flow and will range ordinarily from a few minutes to several days, usually from about one to twenty-four hours with the longer times being used at lower temperatures, and vice versa. The preferred time for a poly(phenylene sulfide) resin, for example, is three to six hours at a temperature ranging from about 40 to about 90° F. below the melt point of the polymer. The heating is preferably carried out in the presence of an oxygen-containing gaseous oxidizing atmosphere such as air.

If desired, a molded product can be made directly by heating a homogeneous mixture of a polymer and a quinone compound in a mold which has the shape of the desired product. This method is useful when the desired product is of such high molecular weight that it is difficult to melt.

The polymers of reduced melt flow produced by the process of this invention can be molded into a variety of useful articles by molding techniques which are well known in the art. Molding should be carried out above the melting point or softening point, but below the decomposition point, of the particular polymer being molded. Suitable molding techniques include injection molding, compression molding, vacuum forming, extrusion, and the like. Non-meltable polymers can be fabricated by means of a binder or by sintering technique using powder molding as used in powder metallurgy.

The polymers of this invention have utility in any use wherein high melting point and/or high temperature stability is desired. These polymers can be blended with fillers, pigments, stabilizers, softeners, extenders, and other polymers. Such fillers as graphite, carbon black, titania, glass fibers, metal powders, magnesia, asbestos, clays, wood flour, cotton floc, alpha-cellulose, mica, and the like can be employed.

In accordance with the invention, polymers or arylene sulfide resins can be cured to give products having excellent high temperature stability chemical inertness, and a high degree of hardness and stiffness even at elevated temperature.

The following examples are intended to illustrate the compositions and processes of this invention.

EXAMPLE I

Poly(phenylene sulfide) was prepared by reacting sodium sulfide with p-dichlorobenzene in N-methylpyrrolidone according to the method of Edmonds et al., U.S. 3,354,129. The raw polymer had an intrinsic viscosity of about 0.14 and a melting point of about 545° F.

A 40.5 g. sample of poly(phenylene sulfide) was admixed with 1.2 g. tetrachloroquinone to give 41.7 g. of a mixture containing 2.88 weight percent chloranil (tetrachloroquinone). Approximately 10 g. of the above mixture was placed in an aluminum dish and cured for 15 minutes in an air oven at 700° F. A control sample of 10 g. of poly(phenylene sulfide) was heated under the same conditions. At the end of the test period, the sample containing the chloranil was rubbery and foamed apparently due to a high degree of crosslinking. The melt flow numbers given below indicate that the chloranil sample possessed a higher level of cure than did the control.

| Run | Sample | Melt flow No. 650° F., g./10 min. |
|---|---|---|
| 1 | Chloranil additive | 934.6 |
| 2 | Control | 1,693.2 |

EXAMPLE II

A stirred slurry of 23.5 g. poly(phenylene sulfide) prepared as above and having an intrinsic viscosity of about 0.14 and a melting point of about 545° F. in 200 ml. acetone containing 1.3 g. chloranil was maintained at ambient conditions until the acetone evaporated. The residue of poly(phenylene sulfide)/chloranil was further dried in a vacuum oven at 70° C. before curing was effected in an air oven at 500° F. at six hours. A similar procedure was carried out on a mixture of poly(phenylene sulfide) and anthraquinone. A control sample of poly(phenylene sulfide) was cured in an air oven at 500° F. for six hours. The melt flow numbers given below show that the chloranil and the anthraquinone additives promoted the curing of the poly(phenylene sulfide):

| Run | Sample | Melt flow No. 650° F., g./10 min. |
|---|---|---|
| 1 | Chloranil additive (5 wt. percent) | 4.0 |
| 2 | Anthraquinone additive (5 wt. percent) | 1,576.0 |
| 3 | Control | 4,613.0 |

This example demonstrates that both chloranil and anthraquinone substantially reduce the melt flow of the poly(phenylene sulfide).

I claim:

1. A heat curable poly(arylene sulfide) resin composition capable of being cured to a free flowing particulate material exhibiting reduced melt flow characteristics comprising a mixture of a poly(arylene sulfide) resin and an effective amount sufficient to substantially reduce the melt flow and effect cure of said resin of at least one compound possessing a quinone structure selected from benzoquinones, anthraquinones and naphthoquinones and halogen and hydrocarbyl-substituted derivatives thereof.

2. A composition according to claim 1 wherein said compound possession a quinone structure is a tetrahaloquinone.

3. A composition according to claim 1 wherein said poly(arylene sulfide) resin is poly(phenylene sulfide) and said compound possession a quinone structure is chloranil.

4. A composition according to claim 1 wherein the amount of said compound possessing a quinone structure present in said composition ranges from 0.1 to about 10 weight per cent of the polymer and said quinones have structural formulas selected from

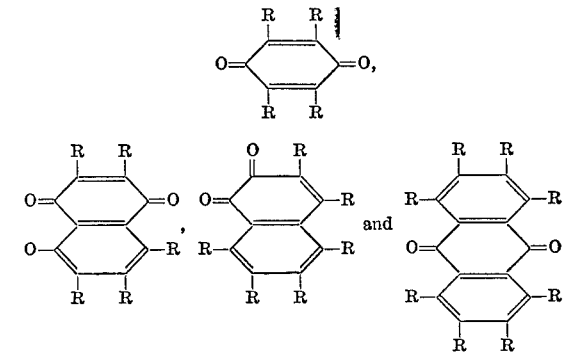

wherein R is a halogen, hydrogen or alkyl having from 1 to 20 carbon atoms or a combination of any of the substituents.

5. A cured poly(arylene sulfide) resin product formed upon heating the composition of claim 1.

6. A molded product formed from the cured composition of claim 5.

7. A process for decreasing the melt flow of poly(arylene sulfide) resins which comprises
   (a) mixing together a particulate poly(arylene sulfide) resin and at least one compound possessing a quinone structure selected from benzoquinones, anthraquinones and naphthoquinones and halogen and hydrocarbyl-substituted derivatives thereof as a curing agent, the amount of said quinone present being sufficient to substantially reduce the melt flow and effect cure of said resin, and
   (b) subjecting the mixture of said resin and quinone obtained in step (a) to an elevated temperature of at least 25° below the melting point of said resin for a period of time sufficient to crosslink said resin and form a free flowing cured particulate poly(arylene sulfide) resin product exhibiting reduced melt flow characteristics.

8. A process according to claim 7 wherein the polymer and quinone are dispersed in a dispersing medium which is a nonsolvent for said polymer and curing agent, the mixture is homogenized, said dispersing medium is removed, and said polymer and curing agent, now homogenously mixed, are heated to a temperature sufficient to substantially reduce the melt flow of the polymer.

9. A process according to claim 7 wherein the temperature to which said mixture is heated is in the approximate range of 25° to 100° F. below the melting point of the polymer, and said heating is carried out in the presence of an oxygen-containing gaseous oxidizing atmosphere for a finite period of time ranging up to about six hours.

10. A process according to claim 8 wherein said dispersing medium is acetone.

11. A process according to claim 7 wherein said free flowing particulate product obtained in step (b) is molded into an article of manufacture.

References Cited

UNITED STATES PATENTS 3,394,106  7/1968  Anderson et al. _____ 260—63

WILLIAM H. SHORT, Primary Examiner

L. L. LEE, Assistant Examiner

U.S. Cl. X.R.

260—32.8 R, 37 R, 37 M, 79